(12) United States Patent
Scholz

(10) Patent No.: US 11,820,082 B2
(45) Date of Patent: Nov. 21, 2023

(54) WELDING METHOD FOR A MULTILAYER COMPOSITE HAVING A BARRIER LAYER

(71) Applicant: Herrmann Ultraschalltechnik Gmbh & Co. KG, Karlsbad (DE)

(72) Inventor: Norman Scholz, Karlsbad (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 249 days.

(21) Appl. No.: 16/628,076

(22) PCT Filed: Aug. 22, 2018

(86) PCT No.: PCT/EP2018/072680
§ 371 (c)(1),
(2) Date: Jan. 2, 2020

(87) PCT Pub. No.: WO2019/038334
PCT Pub. Date: Feb. 28, 2019

(65) Prior Publication Data
US 2021/0154943 A1    May 27, 2021

(30) Foreign Application Priority Data
Aug. 23, 2017   (DE) ..................... 10 2017 119 273.5

(51) Int. Cl.
*B29C 65/08*   (2006.01)
*B65B 51/22*   (2006.01)
(Continued)

(52) U.S. Cl.
CPC ............ *B29C 65/08* (2013.01); *B65B 51/225* (2013.01); *B29C 66/4312* (2013.01);
(Continued)

(58) Field of Classification Search
CPC .............. B65B 51/225; B29C 66/4312; B29C 66/7234; B29C 66/92451; B29L 2031/7128
See application file for complete search history.

(56) References Cited

U.S. PATENT DOCUMENTS 3,681,176 A  *  8/1972  Reifenhauser ........ B29C 66/221
                                                                 156/580.2
5,176,314 A       1/1993  Akazawa et al.
(Continued)

FOREIGN PATENT DOCUMENTS

DE       69022015 T2     4/1996
DE       60101954 T2    12/2004
(Continued)

OTHER PUBLICATIONS

Japanese Office Action, Application No. 2020-528860, dated Aug. 25, 2020 and English translation.
(Continued)

*Primary Examiner* — Daniel McNally
(74) *Attorney, Agent, or Firm* — PAUL & PAUL

(57) ABSTRACT

The invention relates to a welding method for material webs which each consists of a multilayer composite having a barrier layer and are connected to each other via a sealing seam. In order to provide a welding method by means of which sealing seams can be produced which, on the one hand, meet the highest demands on strength and, on the other hand, prevent light, in particular UV light, from penetrating into the product to be packaged, according to the invention, the sealing seems are produced by leading two sealing surfaces of two tools together, wherein the material webs are arranged between the sealing surfaces and the sealing seam is produced having two seams lying beside each other, a main seam and a secondary seam and, during the production of the main seam, the two sealing surfaces exert a main (Continued)

Figure 1:
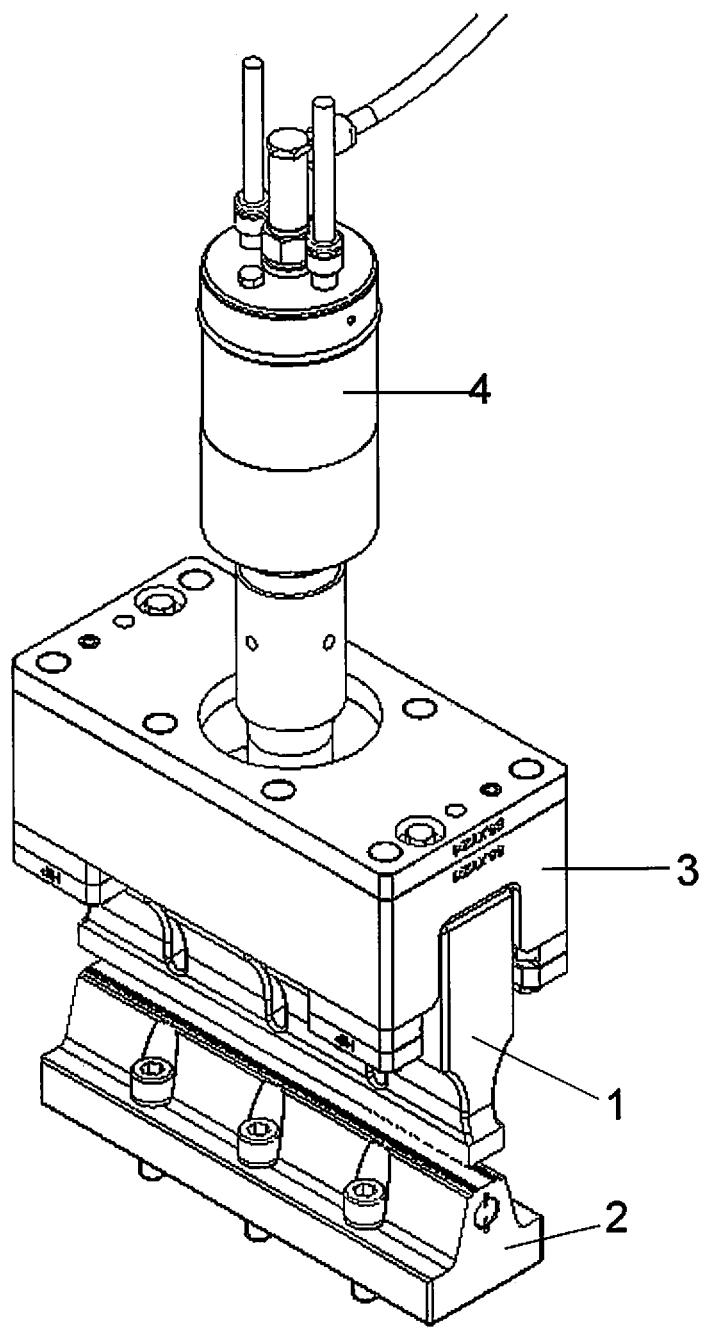

welding pressure on the material webs and, during the production of the secondary seam, the two sealing surfaces exert a secondary welding pressure on the material webs, wherein the secondary welding pressure is lower than the main welding pressure, at least in some sections, and, in the secondary processing step, at least one of the two sealing surfaces is structured.

16 Claims, 4 Drawing Sheets

(51) Int. Cl.
  *B29C 65/00* (2006.01)
  *B29L 31/00* (2006.01)

(52) U.S. Cl.
  CPC .... *B29C 66/7234* (2013.01); *B29C 66/92451* (2013.01); *B29L 2031/7128* (2013.01)

(56) References Cited

U.S. PATENT DOCUMENTS

| | | | | |
|---|---|---|---|---|
| 5,890,347 | A * | 4/1999 | Giacomelli | B29C 65/08 53/477 |
| 6,605,178 | B1 * | 8/2003 | Shinohara | B29C 66/8145 156/580.2 |
| 7,003,934 | B1 * | 2/2006 | Yano | B29C 65/3656 53/374.2 |
| 2004/0011007 | A1 | 1/2004 | Kohl et al. | |
| 2011/0079342 | A1 * | 4/2011 | Romijn | B29C 66/81419 156/73.4 |
| 2014/0338842 | A1 * | 11/2014 | Hull | B29C 65/7451 156/580.2 |
| 2015/0090405 | A1 | 4/2015 | Hull | |
| 2017/0152064 | A1 * | 6/2017 | Aurand | B29C 66/346 |

FOREIGN PATENT DOCUMENTS

| | | | |
|---|---|---|---|
| EP | 0435638 A1 | 7/1991 | |
| EP | 1241098 A1 | 9/2002 | |
| EP | 1241100 A1 * | 9/2002 | ....... B29C 66/81425 |
| EP | 1241100 A1 | 9/2002 | |
| EP | 2292411 A2 | 3/2011 | |
| EP | 3260383 A1 | 12/2017 | |
| JP | H03289467 A | 12/1991 | |
| JP | H0418270 A | 1/1992 | |
| JP | 2001513062 A | 8/2001 | |
| JP | 2007276884 A | 10/2007 | |
| JP | 2012120775 A | 6/2012 | |
| WO | 99/33714 | 7/1999 | |
| WO | 2006041377 A1 | 4/2006 | |
| WO | 2016132986 A1 | 8/2016 | |

OTHER PUBLICATIONS

Nora Linder, International Preliminary Report on Patentability, PCT/EP2018/072680, World Intellectual Property Organization, dated Feb. 27, 2020 (English translation).

* cited by examiner

WELDING METHOD FOR A MULTILAYER COMPOSITE HAVING A BARRIER LAYER

CROSS-REFERENCE TO RELATED APPLICATION

This application is a 371 national stage application of International Application PCT/EP2018/072680, filed Aug. 22, 2018, and claims the priority of German Application No. 10 2017 119 273.5, filed on Aug. 23, 2017.

The present invention concerns a method of producing a sealing seam connecting two material webs of a multilayer composite with a barrier layer wherein the two material webs are positioned between sealing surfaces of a first and a second tool.

To produce a sealing seam use is made for example of a welding tool. In that case a sealing seam is a connecting seam between two material webs. Sealing means connecting the material web surfaces. Generally that is effected by the action of high temperatures. Sealing seams are used in particular for producing and closing bags and sacks and for applying cover films to pots or trays in the packaging industry.

The welding tool has a sealing surface of a width b. For producing a sealing seam the sealing surface is optionally pressed under pressure on to the material webs to be processed. In general there is a corresponding counterpart tool so that the material webs to be processed are clamped between the welding tool and the counterpart tool.

Such methods and welding tools are already known. EP 1 241 098 concerns an ultrasonic transverse sealing apparatus for closing walls of a packaging material filled with a pourable foodstuff product. EP 0 435 638 concerns a sealed container suitable for the packaging of foods, which includes a plastic main body with a flange portion and a cover, wherein the cover can be easily pulled off, and a method of producing the sealed container.

Composite films are frequently used in particular in the packaging industry, comprising individual layers which are optimised for the respective situation of use. Such composite films are also referred to as multilayer composites. Frequently a so-called barrier layer is involved. That can comprise for example aluminium and serves to protect products packaged with the composite film from light irradiation and in particular from exposure to UV light. By way of example such a composite film could comprise four layers, namely a paper layer, a PE layer, an aluminium layer and a PE layer.

In general the sealing seams are introduced into material webs in which the product to be packaged is already disposed so that it is necessary to reckon on the fact that there are still product residues under some circumstances between two material webs which are to be welded together, and such product residues cause difficulty in welding the material webs.

In general the welding quality, that is to say the strength with which two material webs are fixed together, can be increased by increasing the pressure with which the welding tool is pressed on to the material web. It is also known for the welding tool and optionally also the oppositely disposed counterpart tool to be provided with a profile so that the corresponding profile is pressed into the material web and in that case the strength is enhanced and product residues are better displaced out of the processing region.

The use of profiled sealing surfaces and an increase in the pressure however frequently has the result that the barrier layer is damaged so that in actual fact, although a firm connection between the material webs has occurred, UV light can penetrate in a small amount into the bag, which can possibly have a detrimental effect on the quality of the packaged product.

That can only be prevented if the pressure on the material web is reduced, which however possibly results in a connection between the material webs, which does not satisfy the strength, requirements, in particular if there are product residues between the material webs.

Therefore an object of the present invention is to provide a welding method with which it is possible to produce sealing seams which on the one hand meet extremely high demands in terms of strength and which on the other hand prevent light and in particular UV light from being able to penetrate into the product to be packaged.

That object is attained in that the two material webs are positioned between sealing surfaces of a first and a second tool in such a way that the portions of the material web, that are to be connected together, lie upon each other and between the sealing surfaces, the two tools are moved towards each other so that the two sealing surfaces for producing the sealing seam are pressed towards each other, wherein the first tool is an ultrasonic sonotrode which is excited with an ultrasonic vibration while the two sealing surfaces are pressed towards each other and the sealing seam is produced with two mutually juxtaposed seams, a main seam and a secondary seam, wherein the sealing surfaces are so selected that in a main processing portion the maximum spacing between the two sealing surfaces is less than the maximum spacing between the two sealing surfaces in a first secondary processing portion, wherein the main processing portion and the secondary processing portion are in mutually juxtaposed relationship so that in the production of the main seam the two sealing surfaces exert a main welding pressure on the material webs and in the production of the secondary seam the two sealing surfaces exert a secondary welding pressure on the material webs, wherein the secondary welding pressure is at least portion-wise less than the main welding pressure, wherein the secondary seam produced by the secondary processing portion faces towards a product which is to be enclosed in the material webs and the main seam produced by the main processing portion faces away from the product to be enclosed in the material webs, wherein during the welding operation the material webs remain in their position and in the secondary processing portion at least one of the two sealing surfaces is structured.

In that respect the main seam and the secondary seam should directly adjoin each other so that the main seam and the secondary seam extend parallel to each other. The sealing seam accordingly comprises a part which was produced by applying a comparatively higher pressure and a part which was produced by applying a comparatively lower pressure. The main seam is of greater strength than the secondary seam. It will be noted that in regard to the main seam there is the risk that a barrier layer has been damaged. Because the pressure used in producing the secondary seam is lower the risk of damaging the barrier layer in the case of the secondary seam is markedly lower.

Therefore the main seam is produced in the main processing portion while the secondary seam is produced in the secondary processing portion. The main and secondary seams can be produced simultaneously in a single processing step.

The method according to the invention therefore produces a sealing seam in which a higher force is applied to the material web in the region of the main processing portion by virtue of the smaller maximum distance so that a strong connection is produced between the material webs in that region. Directly adjoining the main processing portion is the first secondary processing portion which is distinguished in that the maximum distance between the two sealing surfaces is greater so that here the force transmitted to the material webs turns out to be less and in the region of the secondary processing portion it is possible to ensure that a barrier layer which is possibly present is not severed.

The corresponding sealing seam is then to be oriented in such a way that the part of the sealing seam, produced by the secondary processing portion, is towards the product to be packaged, while the part of the sealing seam, that is produced by the main processing portion, faces away from the product.

In a preferred embodiment the width of the main seam is greater than the width of the secondary seam. Particularly preferably the width of the main seam is at least twice as great as the width of the secondary seam.

In a preferred embodiment of the method the sealing seam is so oriented that the secondary seam faces towards the product to be packaged.

In a further particularly preferred embodiment it is provided that the sealing surfaces are so selected that besides the main processing portion a second secondary processing portion is provided in opposite relationship with the first secondary processing portion, wherein the maximum spacing between the two sealing surfaces in the second secondary processing portion is greater than the maximum spacing between the two sealing surfaces in the main processing portion.

The sealing seam produced with that method is thus distinguished in that a strong connection is produced in a central portion, wherein in the two outer portions produced by the first and second secondary processing portions, the connection of the material webs is less strong, but it is ensured that an aluminium layer which is possibly present has not been severed.

The maximum distance between mutually opposite sealing surfaces can be increased by recesses like for example grooves being introduced into the sealing surface. For example the grooves can be introduced in the region of the secondary processing portions in such a way that the result is a structured surface comprising truncated pyramids. In that case the top side of each truncated pyramid lies exactly in the same plane as the main processing portion.

Alternatively or in combination therewith the secondary processing portions could also be set back relative to the main processing portion. For example the upper surface of the truncated pyramid structure could be "lower" than the surface provided by the main processing portion.

It will be appreciated that the sealing surfaces do not have to be flat. It is also possible for the welding tools and thus the sealing surfaces to be implemented on a cylindrical surface if the welding tools rotate about their axis in the processing operation so that a sealing seam can be produced continuously.

In an embodiment of the welding tool used for the method it is provided that the sealing surface has a main portion extending in the longitudinal direction and a first secondary portion extending in the longitudinal direction, wherein the main portion and the first secondary portion adjoin each other, wherein the first secondary portion is at least partially set back with respect to the main portion in opposite relationship to the direction of a normal vector on the sealing surface by a distance a>0 mm.

The term normal vector on the sealing surface is used to denote a vector which is oriented perpendicularly to the sealing surface and the direction of which is so oriented that it points away from the welding tool.

The sealing surface can for example be substantially flat, in which case then the welding tool for producing a sealing seam with the sealing surface is pressed on to the material web for a predetermined period of time.

As an alternative thereto the sealing surface can also be positioned on the peripheral surface of a cylinder. In that case the welding tool is rotated about the axis of the cylinder so that the sealing surface rolls on the material web. A continuous sealing seam can be produced by means of such a tool.

It is essential however that, beside the main portion, there is a first secondary portion which is at least partially set back with respect to the main portion, with the consequence that a lesser force is applied to the material web in the region of the secondary portion, whereby it can be provided that the risk of a barrier layer contained in the material web, like for example an aluminium layer, being broken through, is reduced.

Therefore, by using the welding tool, a sealing seam is produced, which comprises two regions extending in mutually juxtaposed relationship in the longitudinal direction, wherein that region which has been produced by the main portion of the sealing surface has been produced with a greater pressure so that a good weld of the material webs together is to be expected, and that region which has been produced by the secondary portion of the sealing surface has been produced with a lower pressure, thereby ensuring that a barrier layer if present there has not been damaged.

In a preferred embodiment a welding tool is used, in which the sealing surface has a second secondary portion, wherein the main portion and the second secondary portion adjoin each other so that the first secondary portion and the second secondary portion are positioned on opposite sides of the main portion, wherein the second secondary portion is at least partially set back with respect to the main portion in opposite relationship to the direction of a normal vector on the sealing surface by a distance a>0 mm.

In other words there is a suitably set-back secondary portion on each side of the main portion.

That welding tool can be used to weld a number of bags from a material web. The sealing seam produced has a main seam which is arranged in the centre and which has been formed by the main portion in which a firm weld has occurred. That main seam can be cut through in the longitudinal direction to separate the individual packaging portions.

In principle the method according to the invention can already be implemented by a structure being introduced into the sealing surface in the region of the secondary portion. For example grooves could be introduced into the secondary portion. Those grooves could for example be of such a configuration that truncated pyramids remain in the secondary portion. In that case the top sides of the truncated pyramids would be arranged exactly on the same level as the main portion of the sealing surface. Between the truncated pyramids however there are then regions which are set back with respect to the main portion.

In a further preferred embodiment of the method a welding tool is used in which the total first secondary portion is set back with respect to the main portion in opposite relationship to the direction of a normal vector on the sealing surface by a distance a>0 mm. Preferably the entire second secondary portion, if there is a second secondary portion, is also suitably set back.

If the secondary portions have a structured surface, for example the above-described truncated pyramid structures, then in this embodiment the top sides of the truncated pyramids are also set back so that no region of the secondary portion is on the same level as the sealing surface of the main portion.

In that case the distance a can be relatively small but as far as possible it should be over 0.002 mm and preferably over 0.004 mm.

The effect is generally already achieved if the distance a is less than 0.5 mm, preferably less than 0.05 mm and particularly preferably less than 0.01 mm. If the distance a is selected to be too great there is no longer any formation of a secondary seam and the barrier layer no longer completely encloses the product.

Particularly preferably a welding tool is used, in which the counterpart tool has the described main portion and the secondary portion or portions.

Figure 2:
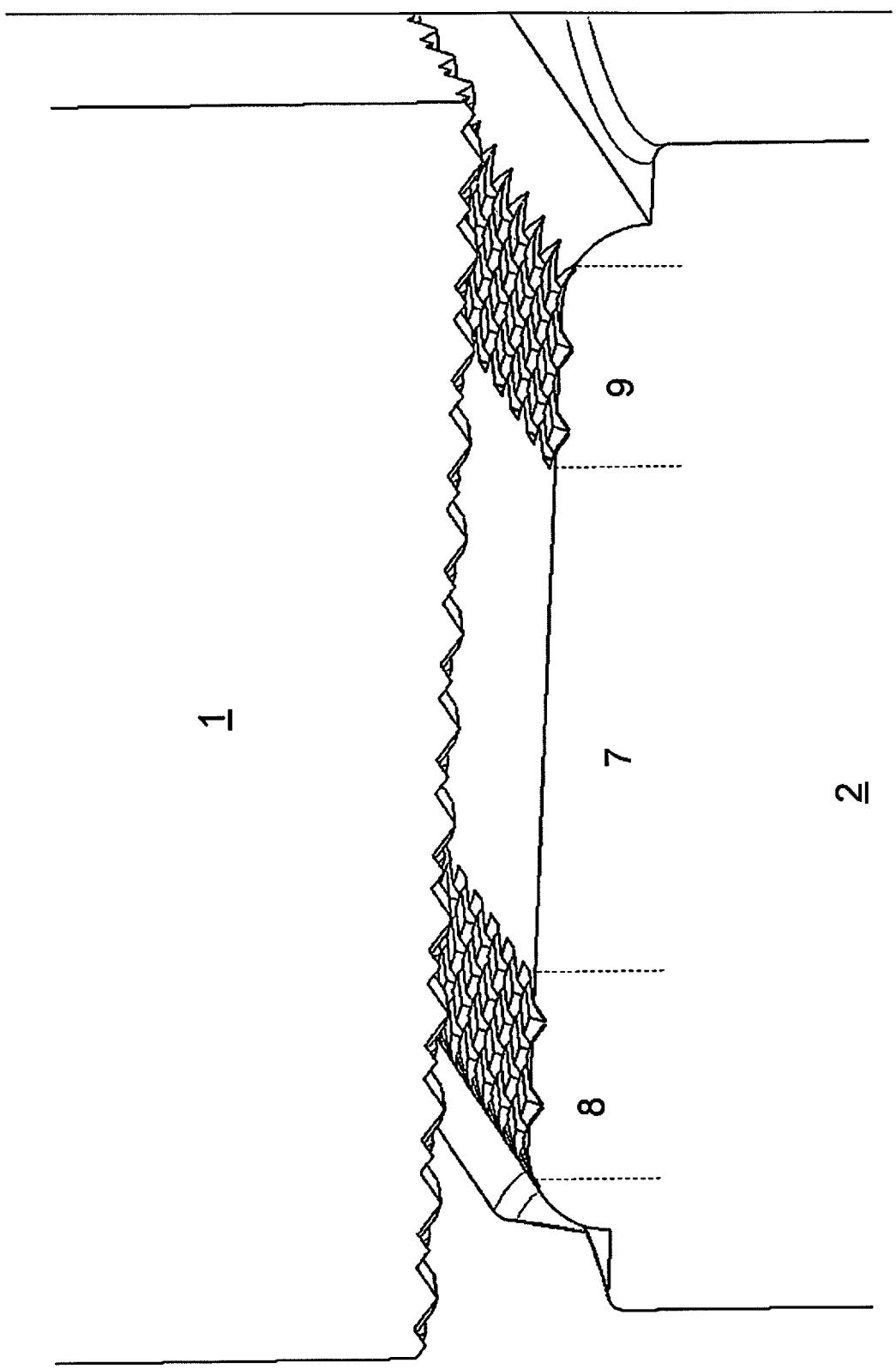
Figure 3:
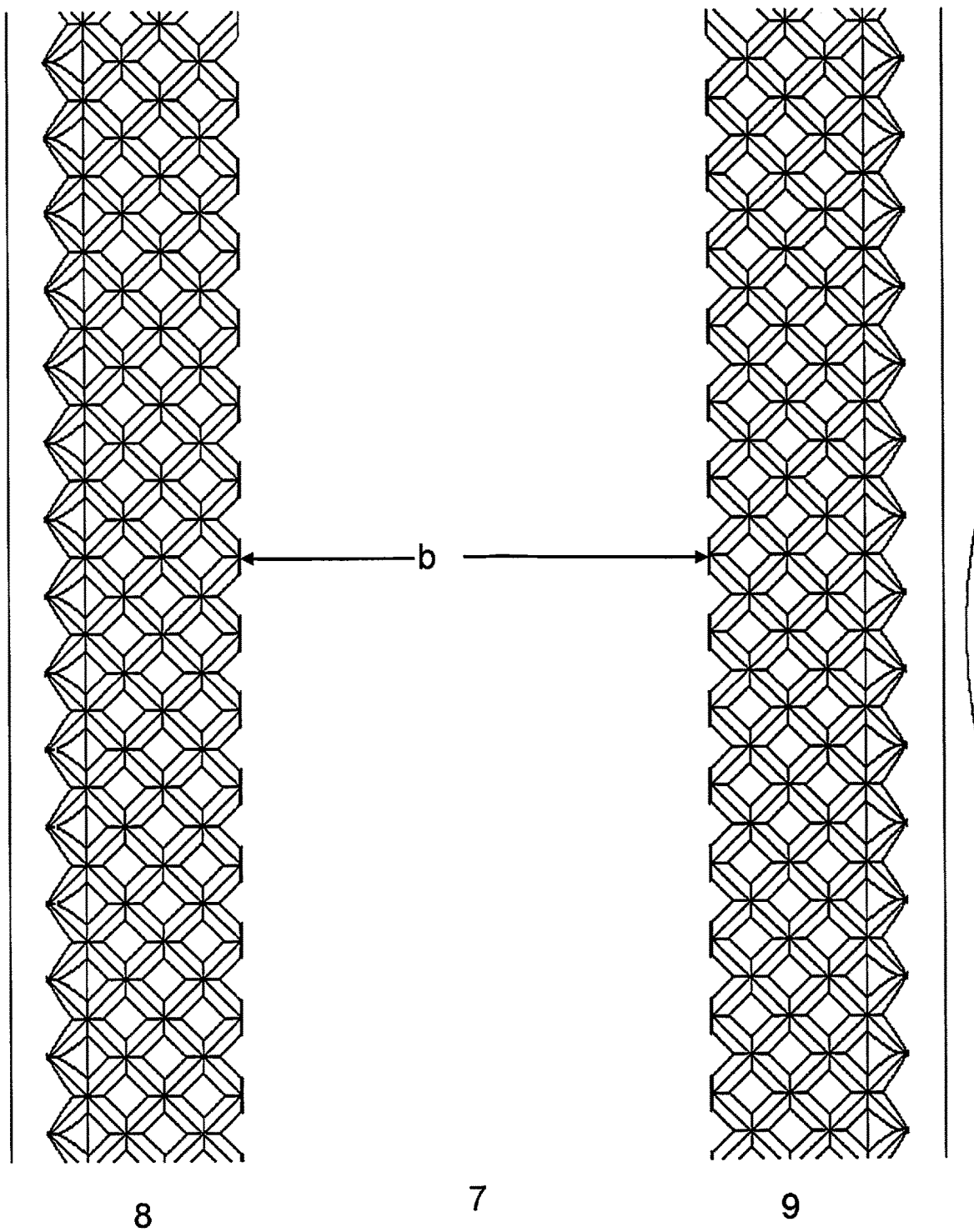
Figure 4:
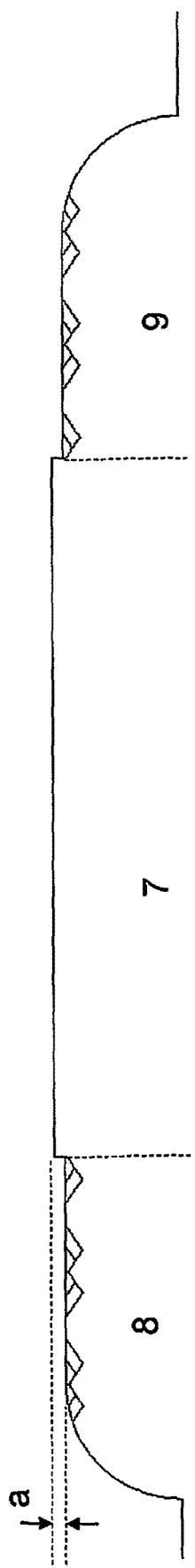

Further advantages, features and possible uses of the present invention will be apparent from the description hereinafter of a preferred embodiment of a welding tool which is used for the method according to the invention, and the accompanying Figures in which:

FIG. 1 shows a perspective view of an embodiment of a welding tool which is used for the method according to the invention, FIG. 2 shows a perspective partial sectional view through the embodiment of the FIG. 1 welding tool, FIG. 3 shows a plan view of the sealing surface of the welding tool, and FIG. 4 shows a sectional view through the welding tool.

FIG. 1 shows a perspective view of an embodiment of a welding tool used for carrying out the method according to the invention. The welding tool has a sonotrode 1 connected by way of an amplitude transformer 5 to a converter 4. The converter 4 converts an electric ac voltage into a mechanical ultrasonic vibration. For that purpose the converter 4 has a series of piezoelements. The mechanical ultrasonic vibration produced by the converter 4 is modified in terms of the amplitude of the vibration by means of the amplitude transformer 5. That vibration is performed by the sonotrode 1. The complete ultrasonic vibration system comprising the sonotrode 1, the amplitude transformer 5 and the converter 4 is held in a holder 3 which has as little effect as possible on the vibration characteristic of the vibration system.

The sonotrode 1 has a sealing surface directed downwardly in FIG. 1. Arranged in opposite relationship to the sealing surface of the sonotrode 1 is a counterpart tool 2 also having a sealing surface which is oriented upwardly in FIG. 1 so that the two sealing surfaces, namely the sealing surface of the sonotrode 1 and the sealing surface of the counterpart tool 2, are opposite.

To produce sealing seams the material webs to be connected together are disposed between the sonotrode 1 and the counterpart tool 2. The sonotrode 1 can then be moved together with the ultrasonic vibration system in the direction of the counterpart tool 2 so that the material webs come into contact both with the sealing surface of the counterpart tool 2 and also with the sealing surface of the sonotrode 1. As a result an ultrasonic vibration is exerted on the material web by the sonotrode, which leads to local fusing of the individual material webs and interconnection thereof.

FIG. 2 shows a perspective sectional view through the sonotrode 1 and the counterpart tool 2.

It will be seen that the sonotrode 1 has a structured sealing surface facing towards the counterpart tool 2. That structured surface can comprise for example truncated pyramids.

The sealing surface of the counterpart tool 2 comprises a main portion 7 extending in the longitudinal direction. In the illustrated embodiment the main portion 7 is flat, that is to say it does not have any structuring whatsoever. Arranged on both sides of the main portion 7 is a respective secondary portion 8, 9. In the illustrated example a structure has been introduced into the secondary portions 8, 9, that is to say the surface facing towards the sonotrode 1 has been portion-wise set back or recessed.

The result of this is that welding of material webs between the sealing surface of the sonotrode 1 and the sealing surface of the counterpart tool 2 is effected with a greater force in the region of the main portion 7 than in the region of the secondary portions 8, 9. Particularly when a multilayer paper composite with a barrier layer, like for example an aluminium layer is used, damage to the aluminium layer can occur in the region of the main portion 7, with the result that air can there pass into the packaging bag. As however there are secondary portions 8, 9 which allow welding with a lesser force no damage to the aluminium layer occurs in the region of the secondary portions 8, 9 so that light and in particular UV light cannot penetrate through the portions of the sealing seam, which have been produced by means of the secondary portions 8, 9.

FIG. 3 once again shows the sealing surface structure of the counterpart tool 2 as a plan view. Here too it is possible to see the main portion 7 which is flat while the secondary portions 8, 9 are structured. In the illustrated example V-shaped grooves have been introduced into the surface at a right angle relative to each other so that this gives a truncated pyramid structuring. The orientation of the grooves is so selected that they include an angle of 45° with the longitudinal direction.

FIG. 4 shows a further sectional view through the counterpart tool 2. It will be seen here that the entire sealing surface, that is to say also the top side of the truncated pyramids of the structured secondary portions 8, 9 have been set back relative to the plane of the main portion 7 by a distance a. For the purposes of illustration the distance a is shown here in greatly exaggerated form. In actual fact however it has been found that the distance a can be in the range of 0.005 mm to 0.01 mm to achieve the effect.

LIST OF REFERENCES

1 Sonotrode
2 Counterpart tool
3 Holder
4 Converter
5 Amplitude transformer
7 Main portion
8, 9 Secondary portions

The invention claimed is:

1. A method of producing a sealing seam connecting two material webs of a multilayer composite with a barrier layer, wherein the two material webs are positioned between sealing surfaces of a first and a second tool (1, 2) in such a way that the portions of the material web, that are to be connected together, lie upon each other and between the sealing surfaces,
  the two tools (1, 2) are moved towards each other so that
    the two sealing surfaces for producing the sealing seam are pressed towards each other, wherein the first tool is an ultrasonic sonotrode (1) which is excited with an ultrasonic vibration while the two sealing surfaces are pressed towards each other and the sealing seam is produced in a welding operation with two mutually juxtaposed welded seams, a main welded seam and a secondary welded seam, the two sealing surfaces having a main processing portion and a first secondary processing portion and a maximum spacing between the two sealing surfaces in each of the main processing portion and the first secondary processing portion, wherein the sealing surfaces are so selected that in the main processing portion the maximum spacing between the two sealing surfaces is less than the maximum spacing between the two sealing surfaces in the first secondary processing portion, wherein the main processing portion and the first secondary processing portion are in mutually juxtaposed relationship so that in the production of the main welded seam the two sealing surfaces exert a main welding pressure on the material webs and in the production of the secondary welded seam the two sealing surfaces exert a secondary welding pressure on the material webs, wherein the secondary welding pressure is at least portion-wise less than the main welding pressure, wherein the secondary welded seam produced by the first secondary processing portion faces towards a product which is to be enclosed in the material webs and the main welded seam produced by the main processing portion faces away from the product to be enclosed in the material webs, wherein during the welding operation the material webs remain in their position and in the first secondary processing portion at least one of the two sealing surfaces has structure elements, wherein the entire first secondary processing portion is set back with respect to the main processing portion in opposite relationship to the direction of a normal vector on the sealing surface by a distance a >0 mm, wherein the distance a is less than 0.01 mm.

2. A method according to claim 1 characterised in that the sealing surfaces are so selected that besides the main processing portion a second secondary processing portion is provided in opposite relationship with the first secondary processing portion, the two sealing surfaces having a maximum spacing in the second secondary processing portion, wherein the maximum spacing between the two sealing surfaces in the second secondary processing portion is greater than the maximum spacing between the two sealing surfaces in the main processing portion.

3. A method according to claim 1 characterised in that structure elements are in the form of a truncated pyramid.

4. A method of utilizing a welding tool having a sealing surface which is intended to come into contact with a material to be processed, wherein the sealing surface is of a width b, for carrying out the method according to claim 1, characterised in that the sealing surface has a main portion extending in the longitudinal direction and a first secondary portion extending in the longitudinal direction, wherein the main portion (7) and the first secondary portion (8) adjoin each other.

5. A method according to claim 4 characterised in that the sealing surface has a second secondary portion (9), wherein the main portion (7) and the second secondary portion (9) adjoin each other so that the first secondary portion (8) and the second secondary portion (9) are positioned on opposite sides of the main portion (7), wherein the second secondary portion (9) is at least partially set back with respect to the main portion (7) in opposite relationship to the direction of a normal vector on the sealing surface by a distance a>0 mm.

6. A method according to claim 4 characterised in that the distance a>0.002 mm.

7. A method according to claim 4 characterised in that the welding tool is an ultrasonic sonotrode (1) or a counterpart tool (2) for an ultrasonic sonotrode.

8. A method according to claim 4 characterised in that the first secondary portion (8) has structure elements.

9. A method according to claim 4 characterised in that the structure elements are in the form of a truncated pyramid.

10. A method according to claim 4 characterised in that the distance a is greater than 0.004 mm.

11. A method of producing a sealing seam connecting two material webs of a multilayer composite with a barrier layer, wherein the two material webs are positioned between sealing surfaces of a first and a second tool (1, 2) in such a way that the portions of the material web, that are to be connected together, lie upon each other and between the sealing surfaces, the two tools (1, 2) are moved towards each other so that the two sealing surfaces for producing the sealing seam are pressed towards each other, wherein the first tool is an ultrasonic sonotrode (1) which is excited with an ultrasonic vibration while the two sealing surfaces are pressed towards each other and the sealing seam is produced in a welding operation with two mutually juxtaposed welded seams, a main welded seam and a secondary welded seam, the two sealing surfaces having a main processing portion and a first secondary processing portion and a maximum spacing between the two sealing surfaces in each of the main processing portion and the first secondary processing portion, wherein the sealing surfaces are so selected that in the main processing portion the maximum spacing between the two sealing surfaces is less than the maximum spacing between the two sealing surfaces in the first secondary processing portion, wherein the main processing portion and the first secondary processing portion are in mutually juxtaposed relationship so that in the production of the main welded seam the two sealing surfaces exert a main welding pressure on the material webs and in the production of the secondary welded seam the two sealing surfaces exert a secondary welding pressure on the material webs, wherein the secondary welding pressure is at least portion-wise less than the main welding pressure, wherein the secondary welded seam produced by the first secondary processing portion faces towards a product which is to be enclosed in the material webs and the main welded seam produced by the main processing portion faces away from the product to be enclosed in the material webs, wherein during the welding operation the material webs remain in their position and in the first secondary processing portion has structure elements, wherein the entire first secondary processing portion is set back with respect to the main processing portion in opposite relationship to the direction of a normal vector on the sealing surface by a distance a >0 mm;

wherein the main processing portion is flat and the first secondary processing portion has structure elements.

12. A method according to claim 11 characterised in that the sealing surfaces are so selected that besides the main processing portion a second secondary processing portion is provided in opposite relationship with the first secondary processing portion, the two sealing surfaces having a maximum spacing in the second secondary processing portion, wherein the maximum spacing between the two sealing surfaces in the second secondary processing portion is greater than the maximum spacing between the two sealing surfaces in the main processing portion.

13. A method according to claim 11 characterised in that the structure elements are in the form of a truncated pyramid.

14. A method of utilizing a welding tool having a sealing surface which is intended to come into contact with a material to be processed, wherein the sealing surface is of a width b, for carrying out the method according to claim 11, characterised in that the sealing surface has a main portion extending in the longitudinal direction and a first secondary portion extending in the longitudinal direction, wherein the main portion (7) and the first secondary portion (8) adjoin each other.

15. A method according to claim 14 characterised in that the sealing surface has a second secondary portion (9), wherein the main portion (7) and the second secondary portion (9) adjoin each other so that the first secondary portion (8) and the second secondary portion (9) are positioned on opposite sides of the main portion (7), wherein the second secondary portion (9) is at least partially set back with respect to the main portion (7) in opposite relationship to the direction of a normal vector on the sealing surface by a distance a>0 mm.

16. A method according to claim 14 characterised in that the distance a>0.002 mm.

* * * * *